United States Patent
Seeley et al.

(10) Patent No.: US 10,150,120 B2
(45) Date of Patent: Dec. 11, 2018

(54) GAS TREATMENT APPARATUS

(71) Applicant: Edwards Limited, West Sussex (GB)

(72) Inventors: Andrew James Seeley, Bristol (GB); Alexander Michael Pope, Clevedon (GB); Thomas Frank Cohn, Axbridge (GB)

(73) Assignee: Edwards Limited, Burgess Hill, West Sussex (GB)

( * ) Notice: Subject to any disclaimer, the term of this patent is extended or adjusted under 35 U.S.C. 154(b) by 184 days.

(21) Appl. No.: 15/031,096

(22) PCT Filed: Sep. 30, 2014

(86) PCT No.: PCT/GB2014/052953
§ 371 (c)(1),
(2) Date: Apr. 21, 2016

(87) PCT Pub. No.: WO2015/067921
PCT Pub. Date: May 14, 2015

(65) Prior Publication Data
US 2016/0236205 A1     Aug. 18, 2016

(30) Foreign Application Priority Data

Nov. 5, 2013   (GB) .................................. 1319533.4

(51) Int. Cl.
*B03C 3/01*     (2006.01)
*B01D 53/14*    (2006.01)
(Continued)

(52) U.S. Cl.
CPC ............ *B03C 3/01* (2013.01); *B01D 53/1456* (2013.01); *B03C 3/16* (2013.01); *B03C 3/41* (2013.01);
(Continued)

(58) Field of Classification Search
CPC combination set(s) only.
See application file for complete search history.

(56) References Cited

U.S. PATENT DOCUMENTS 2,085,349 A * 6/1937 Wintermute ............. B03C 3/00
                                                    313/231.01
3,315,444 A    4/1967 Seversky
(Continued)

FOREIGN PATENT DOCUMENTS

CN      101296711 A      10/2008
DE        2235332 A1 *   5/1974  ............... B03C 3/53
(Continued)

OTHER PUBLICATIONS

Office Action and Search Report, and translation thereof, from counterpart CN Patent Application No. 201480060701.2 dated Dec. 20, 2016.

(Continued)

*Primary Examiner* — Duane Smith
*Assistant Examiner* — Sonji Turner
(74) *Attorney, Agent, or Firm* — Westman, Champlin & Koehler, P.A.; Theodore M. Magee (57) ABSTRACT

A gas treatment includes: a gas scrubber chamber operable to receive an effluent gas stream originating from a manufacturing process tool to be scrubbed therewithin to provide a scrubbed gas stream; and an electrostatic precipitation chamber operable to receive the scrubbed gas stream to be treated therewithin to provide a treated gas stream, one of the gas scrubber chamber and the electrostatic precipitation chamber defining a first chamber and another of the gas scrubber chamber and the electrostatic precipitation chamber defining a second chamber, the first chamber being (Continued)

configured to surround the second chamber. In this way, the first chamber and the second chamber can share the same volume.

5 Claims, 8 Drawing Sheets

(51) Int. Cl.
    *B03C 3/16*     (2006.01)
    *B03C 3/41*     (2006.01)
    *B03C 3/53*     (2006.01)

(52) U.S. Cl.
    CPC ............... *B03C 3/53* (2013.01); *B01D 53/14* (2013.01); *B01D 2252/103* (2013.01); *B01D 2257/2045* (2013.01); *B01D 2257/2047* (2013.01); *B01D 2257/553* (2013.01); *B01D 2258/0216* (2013.01); *B03C 2201/10* (2013.01)

(56) References Cited

U.S. PATENT DOCUMENTS

| | | | |
|---|---|---|---|
| 5,160,510 A | 11/1992 | Steinbacher et al. | |
| 5,215,557 A * | 6/1993 | Johnson | B01D 47/06 55/341.1 |
| 5,250,267 A * | 10/1993 | Johnson | B01D 50/004 137/605 |
| 7,056,367 B2 * | 6/2006 | Trivett | B01D 47/06 95/226 |
| 7,112,236 B2 * | 9/2006 | Hoverson | B03C 3/025 55/DIG. 19 |
| 7,264,658 B1 * | 9/2007 | Heckel | B03C 3/025 96/62 |
| 7,597,750 B1 * | 10/2009 | Krigmont | B03C 3/014 55/DIG. 38 |
| 9,090,984 B2 * | 7/2015 | Anastasijevic | C07C 1/12 |
| 9,533,311 B2 * | 1/2017 | Ray | B03C 3/78 |
| 2009/0169438 A1 | 7/2009 | Bruggink | |
| 2010/0229725 A1 * | 9/2010 | Farsad | B01D 53/1456 96/74 |
| 2010/0303676 A1 * | 12/2010 | Seeley | B01D 47/14 422/169 |

FOREIGN PATENT DOCUMENTS

| | | |
|---|---|---|
| DE | 2235332 A1 | 5/1974 |
| GB | 2472097 A | 1/2011 |
| JP | S4895363 U | 12/1973 |
| JP | S5348283 A | 5/1978 |
| JP | S5428073 A | 3/1979 |
| JP | 04227075 H | 8/1992 |
| JP | 2005205405 A | 8/2005 |
| WO | 2004041412 A1 | 5/2004 |

OTHER PUBLICATIONS

International Search Report and Written Opinion dated Dec. 8, 2014 in corresponding International Application No. PCT/GB2014/052953, 9 pgs.

British Search Report and Examination Report under Sections 17 and 18(3) dated May 7, 2014 in GB Application GB1319533.4, 10 pgs.

Notification of Reason for Rejection dated Mar. 15, 2018 for corresponding Japanese Application No. 2016-527346.

* cited by examiner

GAS TREATMENT APPARATUS

CROSS-REFERENCE TO RELATED APPLICATION

This Application is a Section 371 National Stage Application of International Application No. PCT/GB2014/052953, filed Sep. 30, 2014, which is incorporated by reference in its entirety and published as WO 2015/067921 A1 on May 14, 2015 and which claims priority of British Application No. 1319533.4, filed Nov. 5, 2013.

FIELD OF THE INVENTION

The present invention relates to a gas treatment apparatus. Embodiments relate to a gas treatment apparatus for treating gas containing solid particles such as, for example, $SiO_2$ and acidic gases such as HCl.

BACKGROUND

Gas treatment apparatus are known. Such apparatus are used for treatment of effluent gases arising from epitaxial deposition processes. Epitaxial deposition processes are increasingly used for the manufacturing of high-speed semiconductor devices, both for silicon and compound semiconductor applications. An epitaxial layer is a carefully grown, single crystal silicon film. Epitaxial deposition utilizes a silicon source gas, typically silane or one of the chlorosilane compounds, such as trichlorosilane or dichlorosilane, in a hydrogen atmosphere at high temperature, typically around 800-1100° C., and under a vacuum condition. Epitaxial deposition processes are often doped with small amounts of boron, phosphorus, arsenic, germanium or carbon, as required, for the device being fabricated. Etching gases supplied to a process chamber may include halocompounds such as HCl, HBr, $BCl_3$, $Cl_2$ and $Br_2$, and combinations thereof. Hydrogen chloride (HCl) or another halocompound, such as $SF_6$ or $NF_3$, may be used to clean the chamber between process runs.

In such processes, only a small proportion of the gas supplied to the process chamber is consumed within the chamber, and so a high proportion of the gas supplied to the chamber is exhausted from the chamber, together with solid and gaseous by-products from the process occurring within the chamber. A process tool typically has a plurality of process chambers, each of which may be at respective different stage in a deposition, etching or cleaning process. Therefore, during processing a waste effluent stream formed from a combination of the gases exhausted from the chambers may have various different compositions.

Before the waste stream is vented into the atmosphere, it is treated to remove selected gases and solid particles therefrom. Acid gases such as HF and HCl are commonly removed from a gas stream using a packed tower scrubber, in which the acid gases are taken into solution by a scrubbing liquid flowing through the scrubber. Silane is pyrophoric, and so before the waste stream is conveyed through the scrubber it is common practice for the waste stream to be conveyed through a thermal incinerator to react silane or other pyrophoric gas present within the waste stream with air. Any perfluorocompounds such as $NF_3$ may also be converted to HF within the incinerator.

When silane burns, large amounts of silica ($SiO_2$) particles are generated. Whilst many of these particles may be taken into suspension by the scrubbing liquid within the packed tower scrubber, it has been observed that the capture of relatively smaller particles (for example, having a size less than 1 micron) by the scrubbing liquid is relatively poor. In view of this, it is known to provide an electrostatic precipitator downstream from the scrubber to remove these smaller particles from the waste stream.

Although such apparatus provide for treatment of the effluent gas stream, they have a number of shortcomings. Accordingly, it is desired to provide an improved gas treatment apparatus.

The discussion above is merely provided for general background information and is not intended to be used as an aid in determining the scope of the claimed subject matter. The claimed subject matter is not limited to implementations that solve any or all disadvantages noted in the background.

SUMMARY

According to a first aspect, there is provided a gas treatment apparatus, comprising: a gas scrubber chamber operable to receive an effluent gas stream originating from a manufacturing process tool to be scrubbed therewithin to provide a scrubbed gas stream; and an electrostatic precipitation chamber operable to receive the scrubbed gas stream to be treated therewithin to provide a treated gas stream, one of the gas scrubber chamber and the electrostatic precipitation chamber defining a first chamber and another of the gas scrubber chamber and the electrostatic precipitation chamber defining a second chamber, the first chamber being configured to surround the second chamber.

The first aspect recognises that a problem with existing apparatus is that the volume that they occupy grows non-linearly in response to increasing flow rates of effluent gases to be treated and/or increases in the efficiency requirements for treatment of those effluent gases (typically expressed as a decrease in the concentration of the solid particles and/or acidic gases present in the treated gas stream).

Accordingly, a gas treatment apparatus is provided. The apparatus may comprise a gas scrubber chamber for receiving an effluent gas stream which originates from a manufacturing process tool. The effluent gas stream is to be treated by scrubbing within the gas scrubber chamber in order to generate, as an output, a scrubbed gas stream. The apparatus may also comprise an electrostatic precipitation chamber which receives the scrubbed gas stream. The electrostatic precipitation chamber then treats the scrubbed gas stream and generates a treated gas stream. Either the gas scrubber chamber or the electrostatic precipitation chamber defines a first chamber, whilst the other of the gas scrubber chamber or the electrostatic precipitation chamber defines a second chamber. The first chamber is arranged or configured to surround the second chamber. In this way, the first chamber and the second chamber can share the same volume, which enables a much more compact apparatus to be provided which reduces the size of the apparatus for any given flow rate or efficiency requirement compared to a conventional apparatus. Also, by surrounding the second chamber with the first chamber, a less complex assembly is required, which enables fewer parts to be used.

In one embodiment, the second chamber is retained within the first chamber.

In one embodiment, the first chamber surrounds the second chamber concentrically.

In one embodiment, the first chamber extends around the second chamber at least one of annularly and circumferentially.

In one embodiment, the first chamber and the second chamber share a common wall. Accordingly, a common wall may be provided which may separate the first chamber from the second chamber.

In one embodiment, an inner surface of the common wall defines an outer wall of the second chamber and an outer surface of the common wall defines inner wall of the first chamber. Accordingly, one side of the common wall may form part of the first chamber whilst another surface of the common wall may form part of the second chamber.

In one embodiment, the second chamber comprises an elongate chamber defined by the inner surface of the common wall and the first chamber comprises an elongate annular chamber defined by the outer surface of the common wall and an inner surface of an enclosing wall. Accordingly, the first and second chambers may be generally cylindrically shaped. The second chamber may be nested within the first chamber.

In one embodiment, the gas scrubbing chamber comprises a header tank at least partially defining the gas scrubbing chamber, the header tank being operable to provide a constant flow of a received liquid to the gas scrubbing chamber. Accordingly, a header tank may be provided which provides fluid which flows through the gas scrubbing chamber to remove particles accumulating therewithin. Providing a header tank ensures a constant flow of liquid through the gas scrubbing chamber.

In one embodiment, the electrostatic precipitation chamber comprises outlets for ejecting liquid to provide a circumferentially flowing liquid curtain therewithin. Accordingly, a circulating liquid curtain or weir is also provided within the electrostatic precipitation chamber to assist in the removal of particles accumulating therewithin.

In one embodiment, the electrostatic precipitation chamber defines the first chamber and the gas scrubbing chamber defines the second chamber. Accordingly, the gas scrubbing chamber may be provided within the electrostatic precipitation chamber.

In one embodiment, the electrostatic precipitation chamber comprises outlets for ejecting liquid to provide a circumferentially flowing liquid curtain along both the outer surface of the common wall and the inner surface of the enclosing wall. Accordingly, liquid curtains or weirs may be provided along both of the opposing surfaces of the electrostatic precipitation chamber in order to improve its efficiency.

In one embodiment, the electrostatic precipitation chamber comprises an elongate annular electrode structure located between the outer surface of the common wall and the inner surface of the enclosing wall. Accordingly, a generally cylindrical electrode structure may be provided within the electrostatic precipitation chamber.

In one embodiment, the elongate annular electrode structure extends axially along the electrostatic precipitation chamber.

In one embodiment, the elongate annular electrode structure is located a constant distance between the outer surface of the common wall and the inner surface of the enclosing wall. By placing the structure at an equal distance between the walls of the electrostatic precipitation chamber, a constant electric field can be generated to assist in the removal of particles from the effluent gas stream.

In one embodiment, the elongate annular electrode structure comprises discharge points extending towards the outer surface of the common wall and the inner surface of the enclosing wall.

In one embodiment, a ratio of that number of the discharge points extending towards the outer surface of the common wall and that number of the discharge points extending towards the inner surface of the enclosing wall is proportional to a ratio of an area of the outer surface of the common wall and an area of the inner surface of the enclosing wall. This again helps to provide a uniform electric field within the electrostatic precipitation chamber.

In one embodiment, the gas scrubbing chamber comprises an effluent gas stream inlet for receiving the effluent gas stream and the electrostatic precipitation chamber comprises an treated gas stream outlet for providing treated gas stream, the effluent gas stream inlet and the treated gas stream outlet being positioned to cause gas flow along an axial length of both the gas scrubbing chamber and the electrostatic precipitation chamber. Accordingly, the effluent gas stream is arranged to travel along the axial length of both the gas scrubbing chamber and the electrostatic precipitation chamber. This effectively substantially doubles the process length of the apparatus.

In one embodiment, the gas scrubbing chamber comprises a conduit to convey the scrubbed gas stream to an inlet of the electrostatic precipitation chamber located away from the suspension structure. By conveying the scrubbed gas stream to a position which is distal from the suspension structure, the scrubbed gas stream is also treated by the electrostatic precipitation chamber prior to reaching the suspension structure which reduces the incidence of any deposits on the suspension structure which may otherwise lead to an insulation breakdown.

In one embodiment, the inlet is located in a floor and the suspension structure is located in a ceiling of the gas scrubbing chamber.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention will now be described further, with reference to the accompanying drawings, in which.

DESCRIPTION OF THE EMBODIMENTS

Overview

Before discussing the embodiments in any more detail, first an overview will be provided. Embodiments provide an arrangement where both a gas scrubbing chamber and an electrostatic precipitation chamber are fluidly connected in series but are concentrically arranged such that one is provided within the other. In other words, one of the chambers surrounds the other in a nested configuration to provide a compact arrangement. By controlling the configuration of the inlets and outlets to the two chambers, it is possible to extend the flow distance within the chambers to be around double the length of the apparatus. Also, by utilising additional conduits it is possible to extend the flow distance and entry points to the chambers in order to help reduce the build-up of problematic residues. This approach provides for a more compact apparatus with a significantly reduced part count since the outer chamber is at least partially defined by its retained inner chamber.

Example Arrangement and Gas Flow

Figure 1:
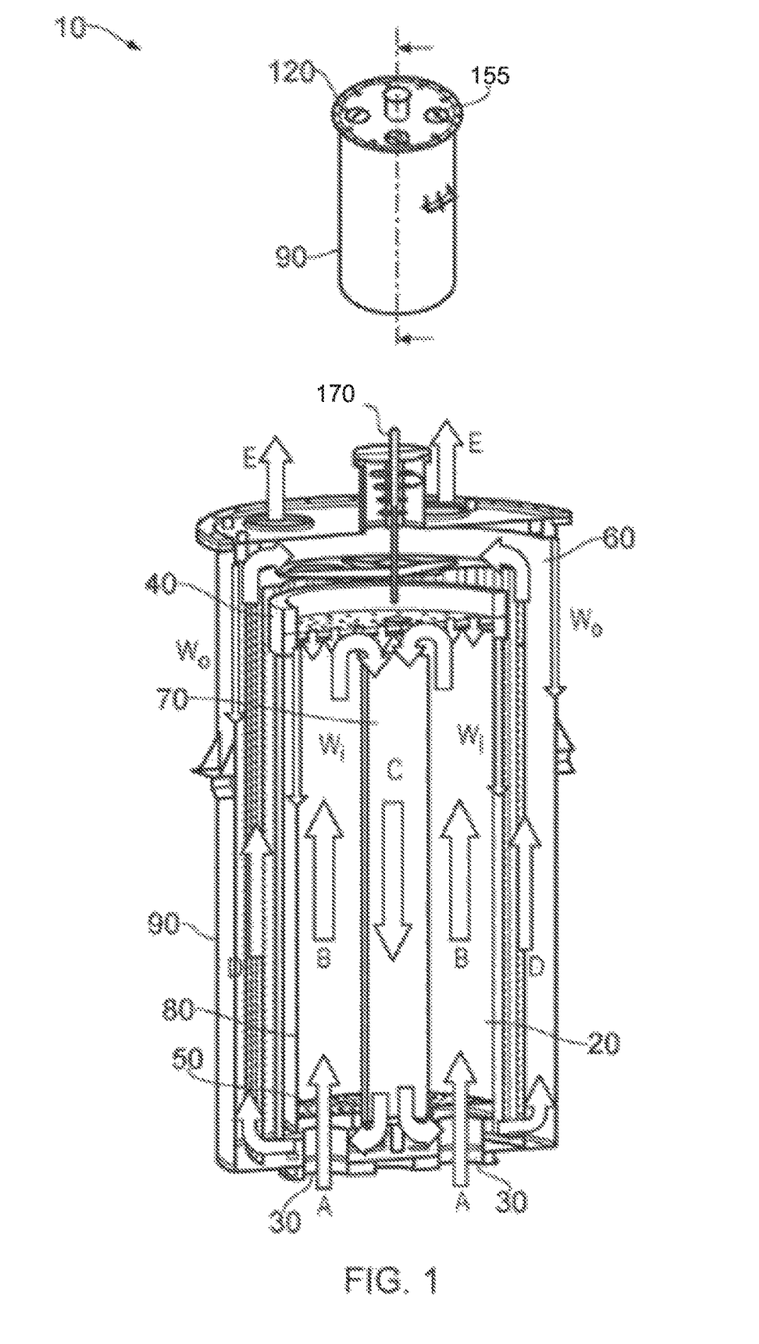
FIG. 1 shows an external view and a section through the gas treatment apparatus which illustrate the flow of an effluent gas through the apparatus according to one embodiment.
Figure 2:
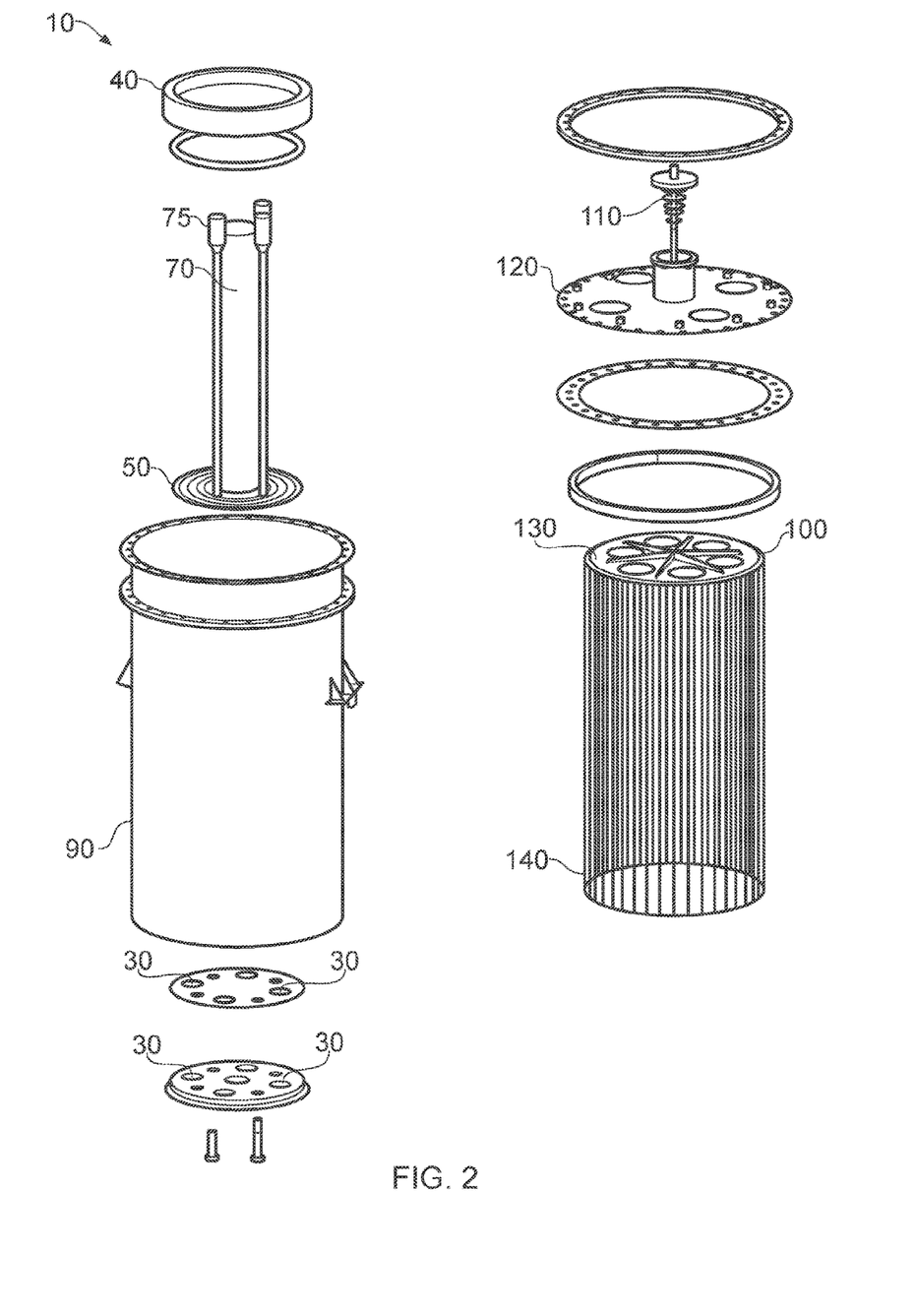
FIG. 2 is an exploded view showing some components of the gas treatment apparatus.
Figure 3:
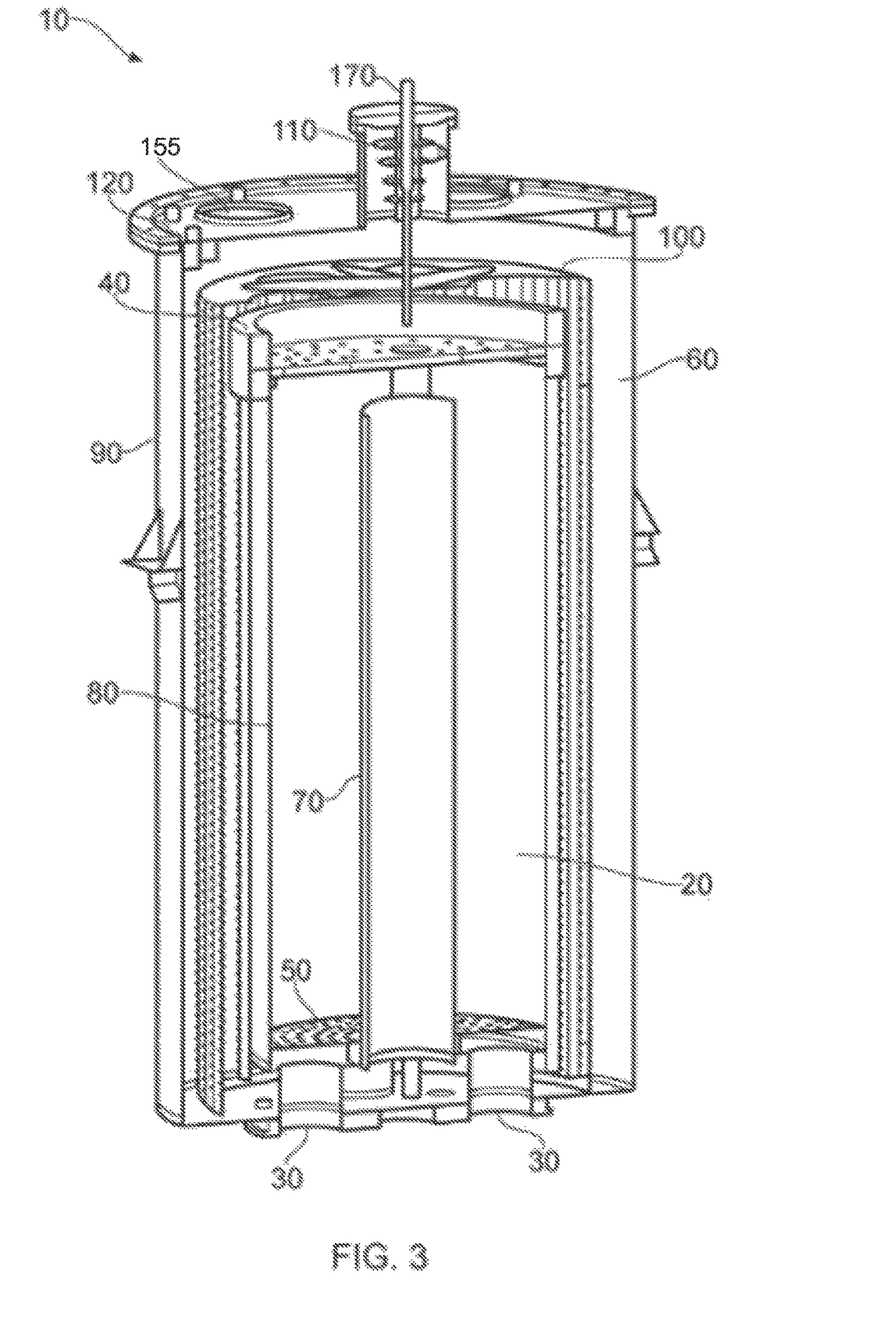
FIG. 3 is a section view through the gas treatment apparatus.

FIGS. 1 to 3 illustrate the arrangement of a gas treatment apparatus, generally 10, according to one embodiment. FIG. 1 shows an external view and a section through the gas treatment apparatus 10 which illustrate the flow of an effluent gas through the apparatus. FIG. 2 is an exploded view showing some components of the gas treatment apparatus 10. FIG. 3 is a section view through the gas treatment apparatus 10.

In overview, the gas treatment apparatus 10 comprises an elongate cylindrical gas scrubber chamber 20 which is filled with packing materials (not shown). The gas scrubber chamber 20 comprises inlets 30 which receive the effluent gas to be processed and which flows in the direction A to B, advancing through the packing material towards a sieve plate 40. As will be explained in more detail below, the sieve plate 40 provides a fluid which flows within the gas scrubber chamber 20, through the packing material and through a sieve floor 50 back to a sump (not shown).

Although in other embodiments it would be possible to provide a configuration where the effluent gas having passed through the scrubbing chamber 20 could exit the scrubbing chamber 20 in the vicinity of the sieve plate 40, this has been found to result in an increase in unwanted deposits within the surrounding electrostatic precipitation chamber 60 and so an arrangement is provided which utilises a downcomer 70 which receives the effluent gas treated by the gas scrubber chamber 20 and conveys it from the top of the gas scrubber chamber 20 in the direction C to beneath the sieve floor 50 and the floor of the gas scrubber chamber 20 and into a bottom portion of the electrostatic precipitation chamber 60.

As can be seen, the electrostatic precipitation chamber 60 comprises an annular chamber which surrounds the gas scrubber chamber 20 concentrically. A dividing wall 80 (not shown in FIG. 2) has an inner surface which defines the gas precipitation chamber 20 and an outer surface which defines an inner surface of the electrostatic precipitation chamber 60. An outer wall 90 has an inner surface which defines another surface of the electrostatic precipitation chamber 60.

Positioned between the outer wall 90 and the inner wall 80 is an electrode structure 100 which is retained using an insulator structure 110 which retains the electrode structure 100 using an elongate conductor 170 in a top plate 120 retained and enclosing an upper end of the electrostatic precipitation chamber 60. The electrode structure 100 comprises a generally cylindrical structure having a supporting plate 130 from which a set of elongate electrodes 140 are arranged circumferentially and extend axially along the axial length of the electrostatic precipitation chamber 60.

As can be seen in FIG. 1, the effluent gas from the downcomer 70 enters the lower portion of the electrostatic precipitation chamber 60 and passes upwards in the direction D past the electrode structure 100 and exits through exhaust ports 155 in the direction E as treated gas.

To facilitate the function of the electrostatic precipitation chamber 60, the outer surface of the inner wall 80 is provided with a fluid curtain flowing from the vicinity of the sieve plate 40 downwards towards the floor of the electrostatic precipitation chamber 60. Likewise, the inner surface of the outer wall 90 is provided with a fluid curtain flowing circumferentially from the vicinity of the top plate 120 down towards the floor of the electrostatic precipitation chamber 60.

Sieve Plate

Figure 4:
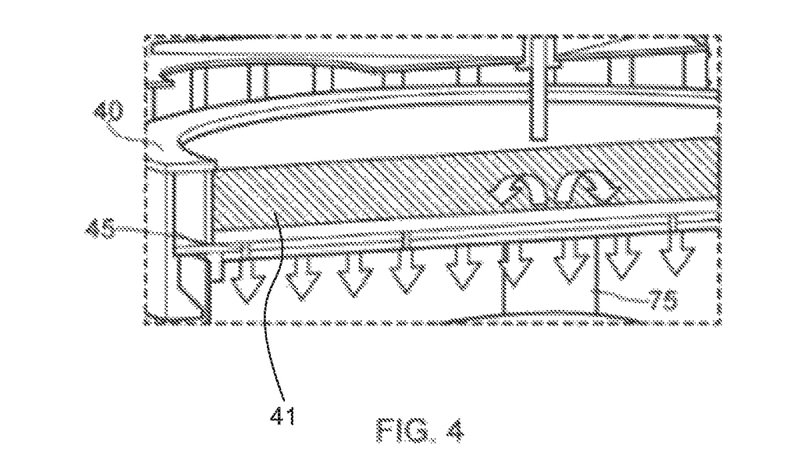
FIG. 4 shows the arrangement of the sieve plate in more detail.

FIG. 4 shows the arrangement of the sieve plate 40 in more detail. As can be seen, the fluid (typically water) is fed through a lower surface of the sieve plate via fluid feeder conduits 75 positioned around the downer 70 which convey the fluid to the sieve plate 40. The sieve plate 40 forms a header tank 41 that maintains a head of fluid, which flows out through an arrangement of holes 45 into the scrubbing chamber 20.

Inner Weir $W_I$

Figure 5:
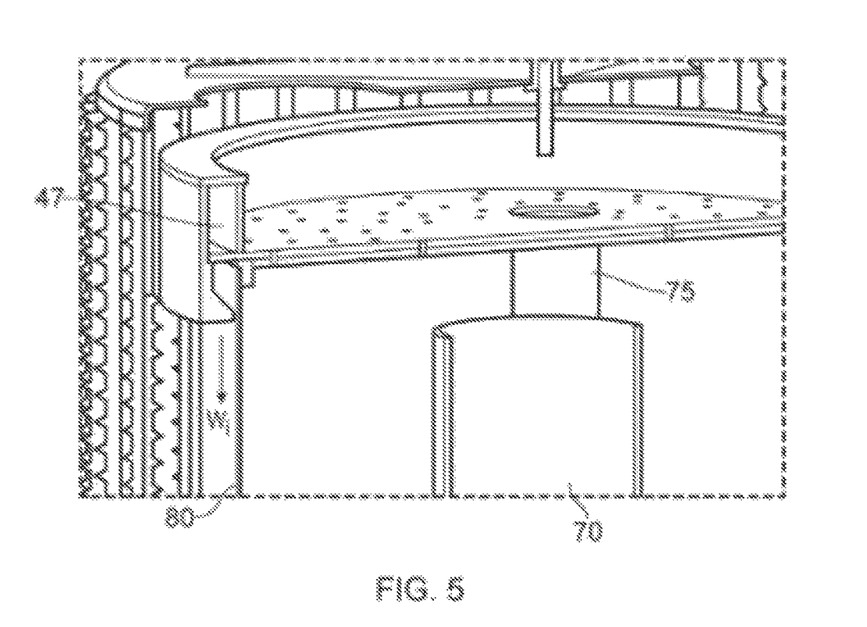
FIG. 5 shows the arrangement of the structure providing inner weir.

The fluid retained by the sieve plate 40 also provides the fluid curtain or inner weir $W_I$ which flows down the surface of the inner wall 80. Fluid flows into the gallery 47 through a small gap, exits the lower surface of the gallery 47 and flows down the outer surface of the inner wall 80, as shown in FIG. 5.

Outer Weir $W_O$

Figure 6:
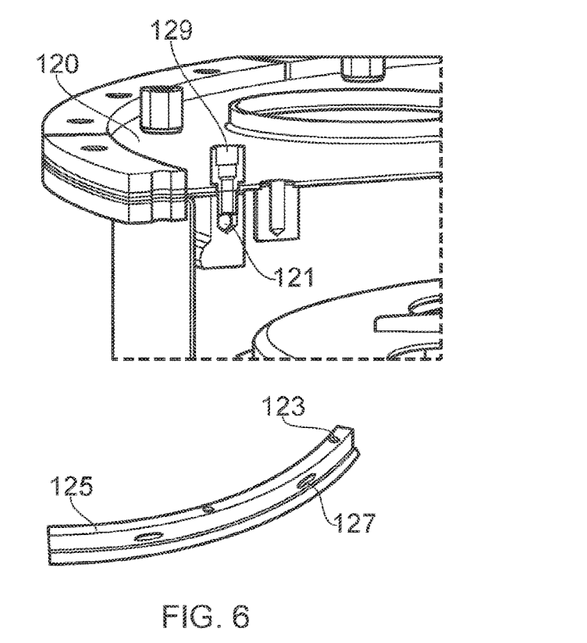
FIG. 6 illustrates the arrangement of the structure providing the outer weir.

FIG. 6 illustrates the arrangement of the structure providing the outer weir $W_O$ in more detail. Coupled with the top plate 120 is a plurality of weir sections 125 arranged to form a ring retained by the top plate 120. Each ring section comprises a number of inlets 123 which receive a coupling 129 which provide a fluid. Fluidly coupled with each inlet 123 via a conduit 121 is an outlet 127 which is arranged to eject fluid tangentially from the weir section 125 to form the outer weir $W_O$ which flows down the inner surface of the outer wall 90.

Electrode Structure Attachment

Figure 7:
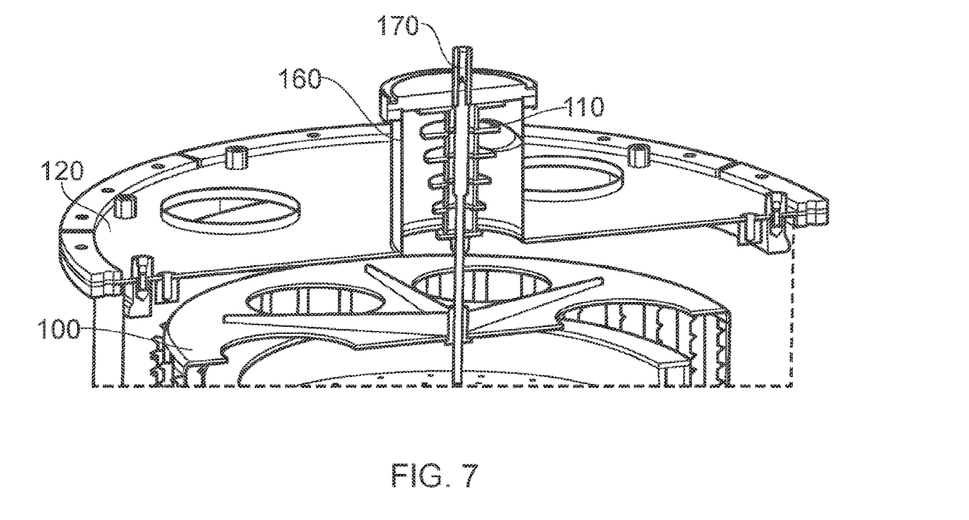
FIG. 7 shows the electrode structure attachment arrangement in more detail.

FIG. 7 shows the electrode structure attachment arrangement in more detail. As can be seen, the electrode structure 100 is retained by a conductor 170 retained by a housing 160 extending from an upper surface of the top plate 120.

An insulator 110 is provided to insulate the electrode structure 100 from the rest of the apparatus 10. The insulator 110 is typically made of glass and a gas purge is provided in order to reduce the concentration of treated effluent gas in the vicinity of the insulator 110, which helps prevent deposits on the insulator which may otherwise lead to the insulator being compromised. As mentioned above, by providing the downer 70, the treated gas in the vicinity of the insulator 110 will have been fully processed by both the gas scrubber chamber 20 and the electrostatic precipitation chamber 60 and so is less likely to cause such deposits.

Electrode Structure

Figure 8:
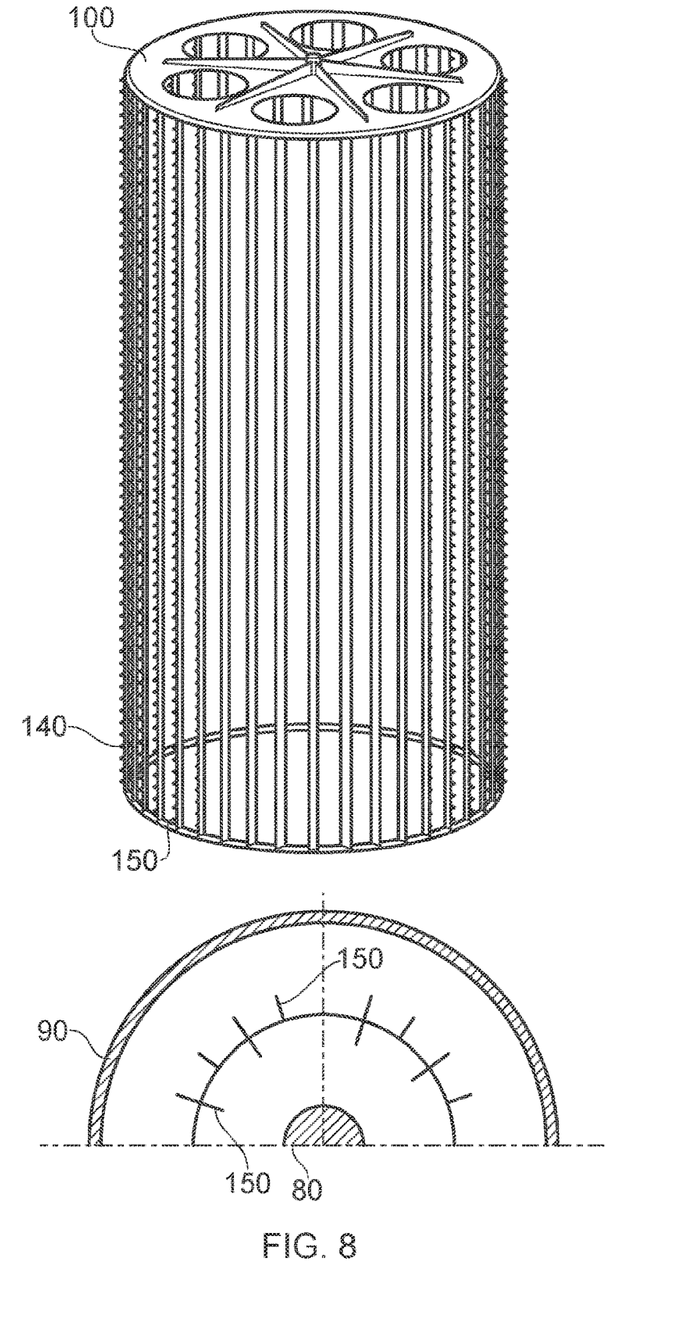
FIG. 8 shows the arrangement of the electrode structure in more detail.

FIG. 8 shows the arrangement of the electrode structure 100 in more detail. The lower portion of FIG. 8 also shows a schematic representation showing the relationship of the electrode structure 100 in relation to the inner wall 80 and the outer wall 90. As can be seen, a number of concentrically arranged elongate electrodes 140 are provided having spikes 150 which extend radially either towards the inner wall 80 or the outer wall 90. In order to maintain a uniform density of discharge points provided by these electrode spikes 150, the ratio of the number of electrode spikes 150 extending towards the inner wall 80 compared to the number of electrode spikes 150 extending towards the outer wall 90 is proportionate to the ratio of the area of the inner wall 80 compared to the outer wall 90.

Concentric Arrangement

Figure 9:
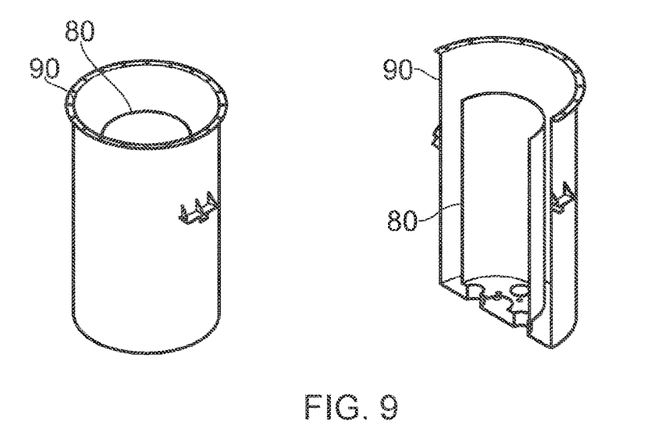
FIG. 9 shows the arrangement of the inner wall and the outer wall in more detail.

FIG. 9 shows the arrangement of the inner wall 80 and the outer wall 90 in more detail. As can be seen, the inner wall 80 is retained within the outer wall 90.

Gas Inlet and Sump

Figure 10:
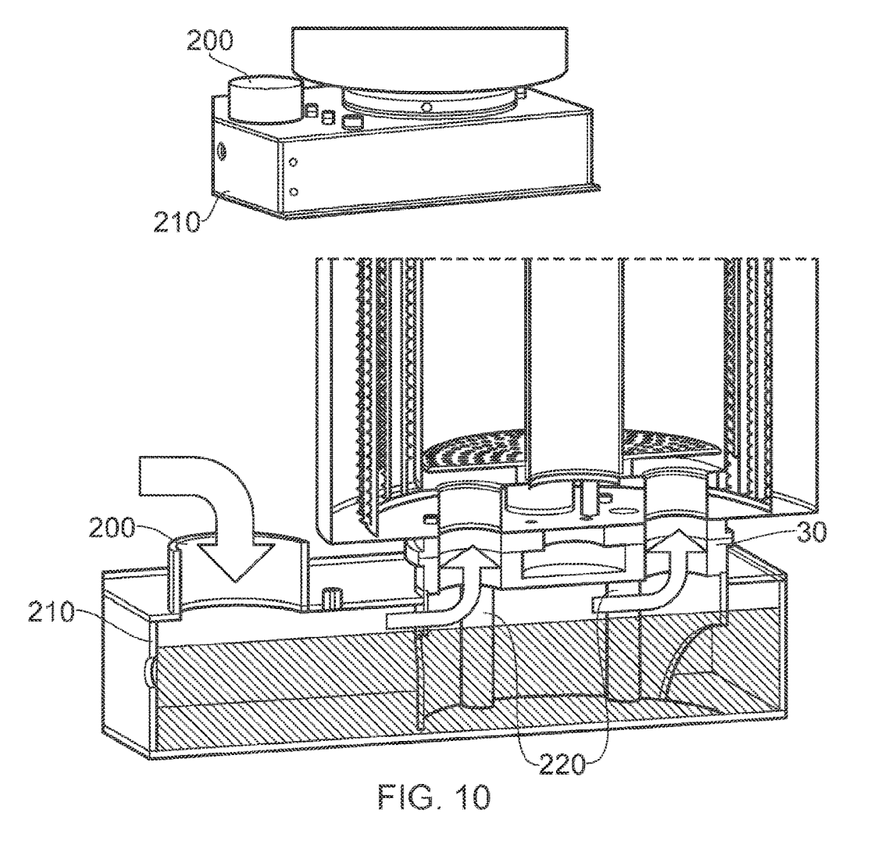
FIG. 10 shows the arrangement of the gas inlet and the sump in more detail.

FIG. 10 shows the arrangement of the gas inlet and the sump in more detail. As can be seen, effluent gas to be treated is received through an inlet 200, flows into a sump structure 210 and is fed through the inlets 30 into the lower portion of the gas scrubber chamber 20. Also within the sump structure 210 is fluid containing contaminants extracted from the effluent gas as it is treated within both the scrubbing chamber 20 and the electrostatic precipitation chamber 60. The fluid from the gas scrubbing chamber 20 flows through the inlets 30 into the sump structure 210, whilst the fluid from the electrostatic precipitation chamber 60 flows through conduits 220 into the sump structure 210.

Sieve Plate Fluid Feed

Figure 11:
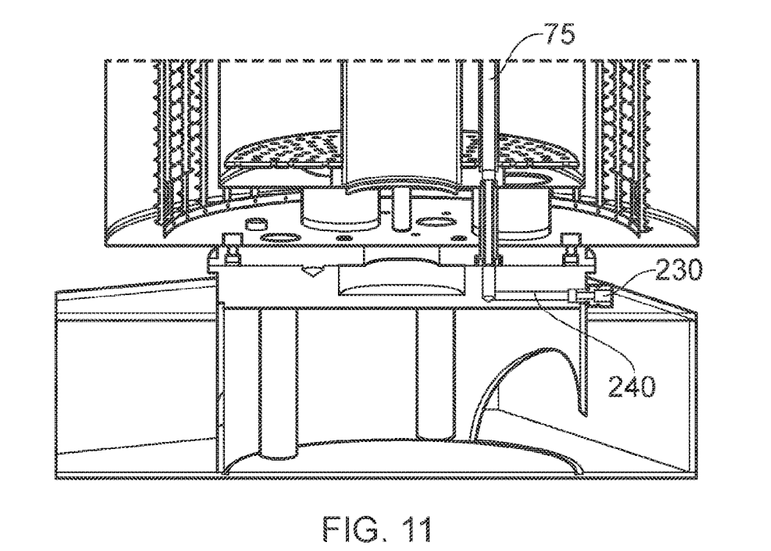
FIG. 11 illustrates the fluid feed provided to feed the sieve plate.

FIG. 11 illustrates the fluid feed provided to feed the sieve plate 40. An inlet 230 is coupled with a fluid supply and conveys fluid via a conduit 240 to a coupling with the feeder conduit 75 which feeds the sieve plate 40.

Tapered Floor

Figure 12:
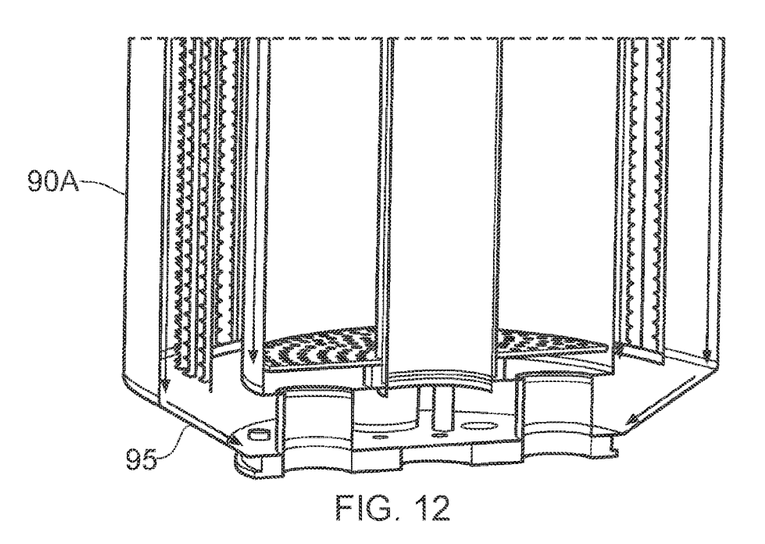
FIG. 12 shows an alternative embodiment of the outer wall which has a tapered or conical floor section.

FIG. 12 shows an alternative embodiment of the outer wall 90 which has a tapered or conical floor section 95 which helps prevent the build-up of any sludge on the floor of the electrostatic precipitation chamber 60.

Accordingly, it can be seen that an arrangement is provided which enables both a gas scrubber chamber 20 and an electrostatic precipitation chamber 60 to be provided to perform series treatment of an effluent gas in a much more compact form than was previously possible due to the concentric arrangement of the two treatment chambers. This enables a smaller apparatus to be provided or enables a higher rate of effluent gas treatment for the same apparatus volume.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A gas treatment apparatus, comprising:
a gas scrubber chamber operable to receive an effluent gas stream originating from a manufacturing process tool to be scrubbed therewithin to provide a scrubbed gas stream; and
an electrostatic precipitation chamber operable to receive said scrubbed gas stream to be treated therewithin to provide a treated gas stream, said electrostatic precipitation chamber defining a first chamber and said gas scrubber chamber defining a second chamber, said first chamber being configured to surround said second chamber wherein said first chamber and said second chamber share a common wall, an inner surface of said common wall defining an outer wall of said second chamber and an outer surface of said common wall defining an inner wall of said first chamber; said second chamber comprising an elongate chamber defined by said inner surface of said common wall and said first chamber comprising an elongate annular chamber defined by said outer surface of said common wall and an inner surface of an enclosing wall; wherein said electrostatic precipitation chamber comprises an elongate annular electrode structure located between said outer surface of said common wall and said inner surface of said enclosing wall, and outlets for ejecting liquid to provide a circumferentially flowing liquid curtain along both said outer surface of said common wall and said inner surface of said enclosing wall;
wherein said gas scrubbing chamber comprises a header tank at least partially defining said gas scrubbing chamber and comprising a sieve plate, wherein a fluid path extends from said header tank to the outlets of the electrostatic precipitation chamber to provide the liquid curtain along the outer surface of the common wall; wherein said gas scrubbing chamber comprises an effluent gas stream inlet for receiving said effluent gas stream and a conduit to convey said scrubbed gas stream to an inlet of said electrostatic precipitation chamber located away from a suspension structure for said elongate annular electrode structure, said electrostatic precipitation chamber comprising a treated gas stream outlet for providing treated gas stream, said effluent gas stream inlet and said treated gas stream outlet being positioned to cause gas flow along an axial length of both said gas scrubbing chamber and said electrostatic precipitation chamber.

2. The apparatus of claim 1, wherein said elongate annular electrode structure extends axially along said electrostatic precipitation chamber.

3. The apparatus of claim 1, wherein said elongate annular electrode structure is located a constant distance between said outer surface of said common wall and said inner surface of said enclosing wall.

4. The apparatus of claim 1, wherein said elongate annular electrode structure comprises discharge points extending towards said outer surface of said common wall and said inner surface of said enclosing wall.

5. The apparatus of claim 4, wherein a number of discharge points extend toward the outer surface of said common wall and a number of discharge points extend toward the inner surface of said enclosing wall, the outer surface of the common wall has an area and the inner surface of the enclosing wall has an area and wherein a ratio of the number of said discharge points extending towards said outer surface of said common wall over the number of said discharge points extending towards said inner surface of said enclosing wall is proportional to a ratio of the area of said outer surface of said common wall and the area of said inner surface of said enclosing wall.

* * * * *